United States Patent
Walton

[15] 3,703,870
[45] Nov. 28, 1972

[54] COUPLER-CARGO PALLET/CONTAINER

[72] Inventor: Roger H. Walton, Dayton, Ohio

[73] Assignee: The United States of America as represented by the Secretary of the Air Force

[22] Filed: March 10, 1971

[21] Appl. No.: 122,706

[52] U.S. Cl. ............... 105/366 R, 213/75 R, 108/51, 108/64
[51] Int. Cl. ............................. B60p 7/00, B61g 5/00
[58] Field of Search ........................... 108/51–58, 64, 108/65; 287/20.92; 312/111; 297/248; 52/561–568; 248/224; 211/105.1; 105/366 R, 367, 368, 369

[56] References Cited

UNITED STATES PATENTS

| | | |
|---|---|---|
| 2,191,222 | 2/1940 | Sheehan ................. 105/366 R |
| 1,900,867 | 3/1933 | Olds ....................... 105/366 R |
| 3,521,579 | 7/1970 | Stafford ........................ 108/64 |
| 964,996 | 7/1910 | Matthes .................... 108/64 X |
| 1,081,378 | 12/1913 | Freeman ..................... 248/224 |
| 2,751,969 | 6/1956 | Kruijt ..................... 297/248 X |
| 2,851,311 | 9/1958 | Gibbs ............................. 304/1 |
| 3,241,684 | 3/1966 | Willsey ................... 211/105.1 |

Primary Examiner—Bobby R. Gay
Assistant Examiner—Glenn O. Finch
Attorney—Harry A. Herbert, Jr. and Arthur R. Parker

[57] ABSTRACT

A cargo-pallet coupler mechanism for interconnecting and thereby joining a series of cargo-carrying pallets or containers in train, and consisting of a pair of elongated coupler-rods each having a depending key element on opposite sides thereof for respective engagement in a corresponding pair of block elements affixed on opposite sides of each pallet or container.

3 Claims, 11 Drawing Figures

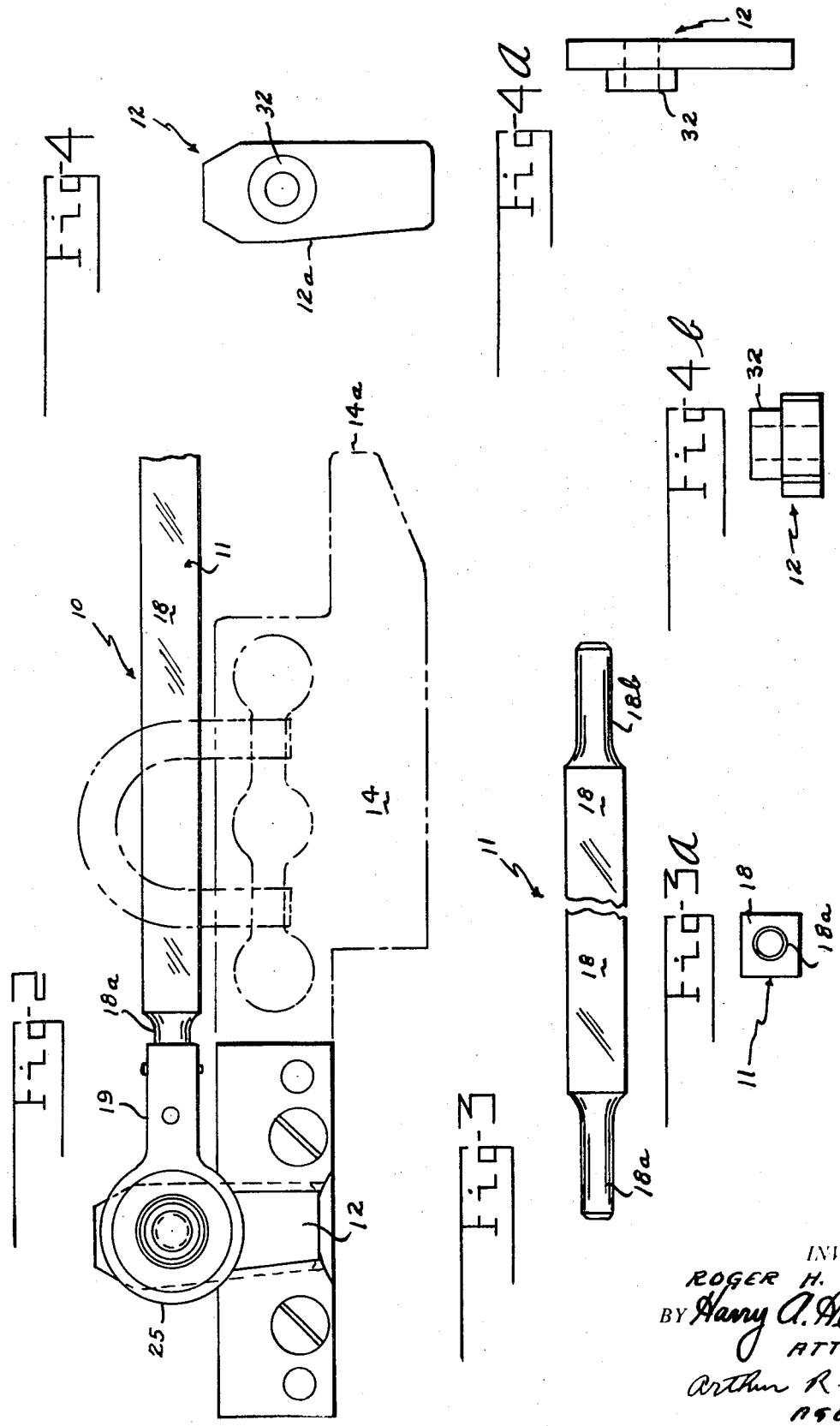

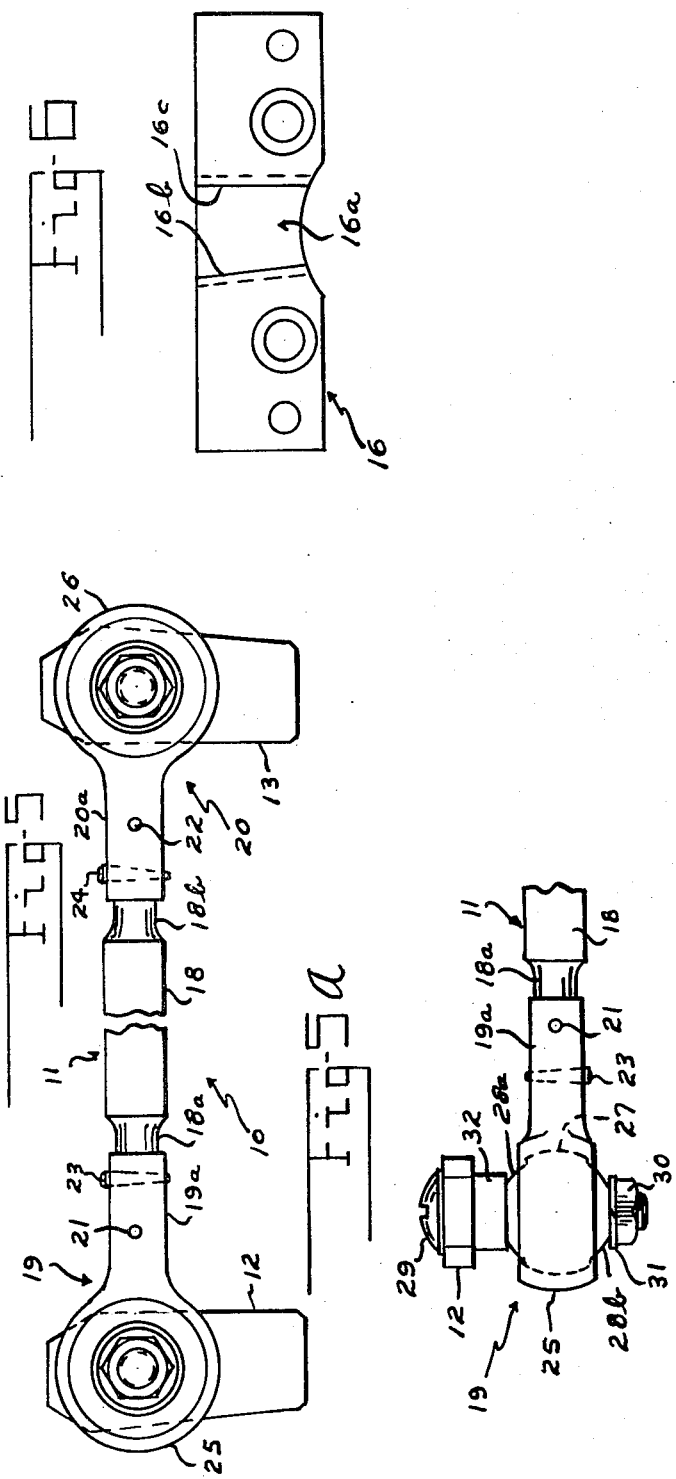

COUPLER-CARGO PALLET/CONTAINER

BACKGROUND OF THE INVENTION

This invention relates generally to a coupling device for interconnecting multiple air cargo-loads in train in preparation for the loading, or off-loading thereof into and from the cargo compartment of a delivery aircraft.

The individual handling of a plurality of pallet-supported, or container-enclosed cargo loads, during the filling or emptying of the cargo space of a cargo aircraft, has proven to be very time-consuming and thus quite uneconomical, particularly in commercial-type operations. Moreover, in a combat situation involving particularly the present-day, larger-types of cargo aircraft, any excessive delay in the on-loading, or off-loading of critical supplies needed by beleaguered troops, for example, could prove disastrous. Therefore, some simplified and easily-applied means of interconnecting a plurality of individual cargo loads in a serial formation to thereby ensure the quick loading and unloading thereof into and from the cargo aircraft is most important. In this regard, the new and improved device or mechanism of the present invention, to be hereinafter described in the following summary and detailed description, resulted from a governmental program in which various coupling devices were investigated.

SUMMARY OF THE INVENTION

The present invention consists briefly in the use of a pair of cargo pallet or container-coupling devices interconnected between each adjacently positioned pair of a series of cargo-carrying pallets or containers. Each coupling device comprises simply an elongated rod element incorporating a depending key element on opposite ends thereof, which key elements engage in suitable slots formed in block elements fixed near each end, and on opposite sides of each cargo pallet or container. The key elements have been tapered to thereby automatically position the cargo pallets or containers in their interconnected relation.

Other objects and advantages of the invention will become readily apparent from the following disclosure thereof, taken in connection with the accompanying drawings, in which:

BRIEF DESCRIPTION OF THE DRAWINGS

FIG. 2 is a side-elevational view, partly broken-away, illustrating further details of one of the depending key elements positioned on one end of the pallet coupler-rod portion of the invention, and further showing the said key element installed in position within one of the pallet coupler-block elements that may be affixed to the pallet;

FIGS. 3 and 3a represent side elevational and end views, respectively, showing further details of the pallet coupler-rod of the inventive assembly;

FIGS. 4, 4a and 4b represent front, side and top views, respectively, showing further details of one of the pallet coupler-key elements of the invention;

FIGS. 5 and 5a, respectively, depict side elevational and top views, partly broken-away, showing the assembly of the inventive pallet coupler mechanism; and FIGS. 6 and 6a, respectively, indicate front and top views more clearly showing details of one of the pallet coupler-blocks of the inventive assembly.

DESCRIPTION OF THE PREFERRED EMBODIMENT

Figure 1:
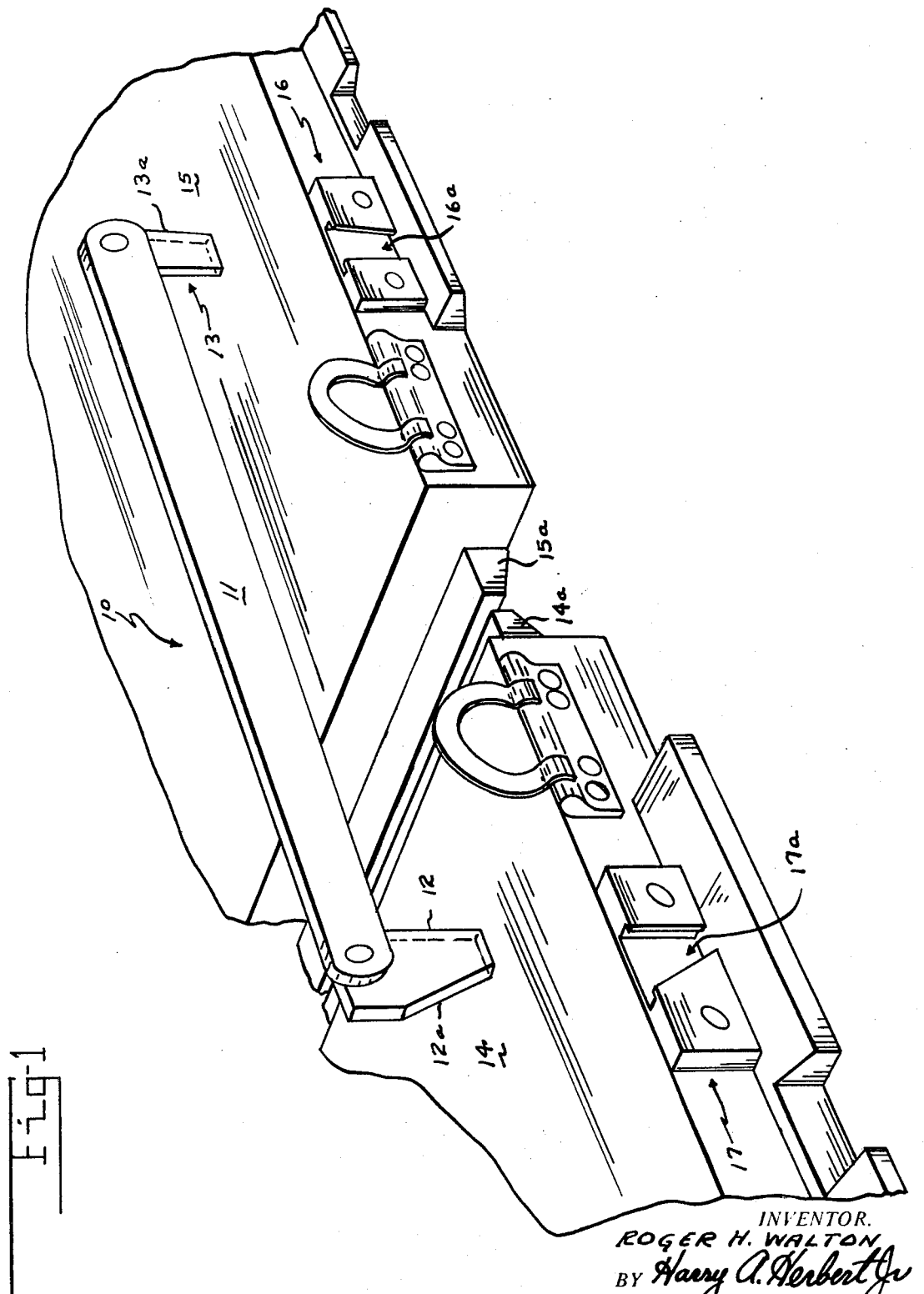
FIG. 1 is a schematic and somewhat top-perspective view, partly broken-away, of the pallet coupler device of the present invention, showing the position thereof just prior to, or immediately after, its installation in, or removal from, a pair of cargo pallets.

Referring to the drawings and, in particular, to FIG. 1 thereof, a pair of adjacently positioned cargo pallets to be interconnected in the novel manner taught by the present invention have been illustrated in partly schematic and broken-away form at 14 and 15. The inventive cargo pallet-coupler device, which would, in actual practice, be used in pairs on each side of, and between each pair of adjacent cargo pallets of a series thereof to be formed in a serial or train configuration, is schematically illustrated generally at 10 as including a relatively elongated, rod member 11, and a pair of substantially identical cargo pallet-key-locking and/or interconnecting elements, indicated respectively at 12 and 13 as being disposed on, and extending in depending relation from, opposite ends of said rod member 11. To provide for the interconnection of the aforementioned coupler device 10 to, and between the pallets 14 and 15, the key elements 12 and 13 may be respectively engaged within slots or sockets, as at 16a and 17a, respectively formed in a pair of block elements, indicated at 16 and 17, formed on the corresponding side of the pallets 14 and 15, as shown. Of course, each cargo pallet 14, 15 would actually include a series of four such block elements, as at 16 and 17, with a corresponding pair formed on the opposite sides thereof for respective engagement with other, identical coupler devices (not shown).

The above-referred to depending key elements 12 and 13 are unique in that each incorporates a built-in, self-locking feature by being formed with a novel, tapered surface on the outer side thereof, as is generally indicated at 12a and 13a in FIG. 1 for both key elements, and at 12a in FIG. 4 for the key element 12. The previously-mentioned sockets or slots 16a and 17a of the block elements 16, 17 are made of the same size and configuration as the key elements 12 and 13 and, therefore, likewise each incorporates both tapered and straight slot portions indicated respectively at 16b and 16c in FIGS. 6 and 6a, for example, for the key elements 12. With the use of the above-described tapered surfaces formed on both of the key elements 12 and 13 and, of course, in the matching sockets or slots 16a, 17a, the inherent snug-fit engagement of the said key elements 12, 13 within the slots 16a, 17a will produce a positive lock therebetween to thereby prevent the accidental release of the key elements 12 and 13 from their engaged and interconnected positions. Moreover, the foregoing tapered configuration of the key elements 12 and 13, when in their engaged position, has the further advantage of automatically ensuring that the cargo pallets 14 and 15, as well as the end rails 14a and 15a thereof, are positioned in proper alignment relative to each other. The assembled condition of the key elements 12, 13 in the sockets or slots 16a, 17a is clearly depicted for the key element 12 in the partly broken-away and schematic view of FIG. 2. Naturally, the same condition also prevails for the key element 13.

A more detailed showing of the previously described, relatively elongated rod member 11 of the unique cargo coupler device 10 is illustrated in FIGS. 3 and 3a. As seen in the latter figures, rod member 11 actually consists of a relatively enlarged-diameter, main, central rod portion at 18 that may be of a square configuration (Note FIG. 3a), in one form thereof, and which may terminate in oppositely disposed rod-end portions at 18a and 18b that may be necked-down or of a reduced-diameter and circular configuration, as shown. The previously described, novel depending key elements 12 and 13 may be each attached, as seen particularly in FIGS. 5 and 5a, to opposite ends of the aforementioned rod member 11 by means of a universal-type joint inherent in each of a pair of identical rod-end bearing members, indicated respectively and generally at 19 and 20. The latter members 19, 20 may each incorporate an integral straight link portion, indicated in 19a and 20a, and which respectively interconnect or attach the rod-end bearing members 19 and 20 to the opposite rod-end portions 18a and 18b of the rod member 11. The said straight link portions 19a, 20a, may be made with internally disposed and relatively elongated openings having a diameter equal to that of the rod-end portions 18a and 18b, and, thus, may be easily assembled to the said rod-end portions, as seen in FIG. 5, by being slid thereover in snug-fit relation thereto. Thereafter, each straight link portion 19a and 20a, and rod-end portions 18a and 18b of the rod member 11, may be drilled in their assembled condition and reamed with tapered openings, as at 21 and 22, and then affixed to each other by means of tapered pins, as at 23 and 24, inserted therewithin.

With specific reference again to FIG. 5, the rod-end bearing members 19 and 20 have been illustrated as each further including a circular-shaped, outer rod-end bearing member-female-type of bearing support at 25 and 26, respectively. Revolvably mounted within each of said female bearing supports 25, 26 is a spherical segment, as for example that indicated in doted lines at 27 in FIG. 5a. The spherical segment 27, which revolves in all directions within the female bearing support 25 and therefore acts as a universal joint, provides unique support for the depending key element 12, by means of the incorporation of a raised boss on a portion of the surface thereof, which raised boss is indicated at 28a and 28b as projecting outwardly beyond both sides of the plane of the female bearing support 25. The key element 12 may be fixedly mounted to the aforementioned raised boss, at the section thereof indicated at 28a, as by means of a bolt and nut arrangement indicated respectively at 29 and 30. A lock washer is provided at 31 for the usual purpose. Actually, each of the said key elements 12, 13 may be provided with a spacer element, as indicated for example at 32 in FIGS. 4a, 4b and 5a, for the key element 12, in order to locate the latter in its proper position. Thus, it is actually the spacer element 32 that is held in immediate contact with raised boss section 28a, as is depicted clearly in the aforementioned FIG. 5a, by means of the previously noted, bolt and nut arrangement at 29 and 30.

With the above-described unique arrangement, wherein the novel key elements 12 and 13 of the present invention are mounted to the rod member 11 of the inventive coupler device 10, by way of the previously described rod-end bearing members 19 and 20, the aforesaid key elements are obviously uniquely mounted, when in their assembled condition, to freely accommodate and specifically provide for both of any hinging and/or swiveling action that may, and usually does, occur thereat during the loading and/or unloading of an aircraft-cargo compartment.

I claim:

1. In coupling means for interconnecting adjacently positioned pairs of a plurality of cargo-carrying pallets or containers in a serial formation to thereby facilitate the loading and unloading thereof into, and from the cargo compartment of a delivery aircraft, said means comprising; first, permanently affixed, cargo-pallet or container-mounted block element means attached to the sides of said pallets or containers in adjacent and predeterminedly spaced-apart pairs, and further each incorporating a built-in and oppositely tapered slot, each corresponding, pairs of block element means being utilizable in attaching said adjacently-positioned pairs of pallets or containers to each other; and second, cargo-pallet or container-interconnecting means for releasably attaching opposite sides of each adjacently positioned pair of pallets or containers and each including a relatively elongated and indirect cargo pallet or container-interconnecting-rod member extending in its normally mounted position between, in parallel and spaced-apart relation to, and over the upper surfaces of each of said pair of adjacently positioned pallets or containers, and a pair of intermediately positioned and relatively short, direct cargo-pallet or container-interconnecting-elements respectively extending from, and in depending relation to, the opposite ends of said rod member, each of said pair of depending elements comprising an interconnecting key member tapered in the same configuration as, and thereby being respectively engageable in locking relation within the built-in tapered slot of each of the block element means corresponding thereto for thereby automatically and positively ensuring correct alignment between adjacently positioned pairs of pallets or containers.

2. In coupling means for interconnecting adjacently positioned pairs of a plurality of cargo-carrying pallets or containers in a serial formation as in claim 1, and a universal-type of joint-attachment means interconnected between the said rod member and the pair of depending elements respectively extending from the opposite ends thereof to thereby allow relative movement between adjacent pallets or containers during the serial loading or unloading thereof into, and from a cargo aircraft.

3. In coupling means for interconnecting adjacently positioned pairs of a plurality of cargo-carrying pallets or containers in a serial formation as in claim 2; said universal-type of joint-attachment means comprising combined hinge and swivel means including a rigid rod-end bearing member incorporating an integral straight link portion in its inner end and having an elongated inner passage telescopically positioned in snug-fitting relation to, and rigidly mounted on a necked-down portion on the opposite ends of the relatively elongated rod member, and a circular-shaped female, rod-end bearing member-support on its outer end; a spherical element positioned and revolvable in all directions within said female, rod-end bearing member-support and having a raised boss portion projecting outwardly of the said female bearing-support; and rigid attachment means positively mounting a spacer element and the upper end portion of each of said pair of depending elements in hinging and swiveling relation to the spherical element on each end of said rod member.

* * * * *